(12) United States Patent
Megahed et al.

(10) Patent No.: US 11,004,097 B2
(45) Date of Patent: May 11, 2021

(54) REVENUE PREDICTION FOR A SALES PIPELINE USING OPTIMIZED WEIGHTS

(71) Applicant: International Business Machines Corporation, Armonk, NY (US)

(72) Inventors: Aly Megahed, San Jose, CA (US); Hamid Reza Motahari Nezhad, San Jose, CA (US); Peifeng Yin, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 805 days.

(21) Appl. No.: 15/199,484

(22) Filed: Jun. 30, 2016

(65) Prior Publication Data

US 2018/0005253 A1 Jan. 4, 2018

(51) Int. Cl.
*G06Q 30/02* (2012.01)
*G06Q 10/06* (2012.01)

(52) U.S. Cl.
CPC ....... *G06Q 30/0202* (2013.01); *G06Q 10/067* (2013.01)

(58) Field of Classification Search
None
See application file for complete search history.

(56) References Cited

U.S. PATENT DOCUMENTS

| | | |
|---|---|---|
| 6,611,726 B1 | 8/2003 | Crosswhite |
| 6,745,150 B1 | 6/2004 | Breiman |
| 7,742,940 B1 | 6/2010 | Shan et al. |
| 7,945,472 B2 | 5/2011 | Pappas et al. |
| 2003/0101087 A1* | 5/2003 | Walker ............ G06Q 10/10 705/35 |
| 2006/0155596 A1 | 7/2006 | Thier |
| 2008/0167942 A1 | 7/2008 | Amemiya et al. |
| 2008/0288889 A1* | 11/2008 | Hunt ............ G06Q 30/02 715/810 |

(Continued)

OTHER PUBLICATIONS

Baier et al., "Sales-force performance analytics and optimization," IBM Journal of Research and Development, vol. 56, No. 6, Nov./Dec. 2012, pp. 8:1-8:10.

Abdel-Khalik et al., "Sales revenues: Time-series properties and predictions," Journal of Forecasting, vol. 2, No. 4, 1983, pp. 351-362.

(Continued)

*Primary Examiner* — Alan Torrico-Lopez
(74) *Attorney, Agent, or Firm* — Zilka-Kotab, P.C.

(57) ABSTRACT

A computer-implemented method according to one embodiment includes receiving historical sales data, transforming a nonlinear, non-convex optimization model for weighting optimization into a linear optimization model, determining a number of historical periods of the historical sales data and weights to be applied to a historical conversion rate and a historical growth rate for the number of historical periods of the historical sales data, utilizing the nonlinear, non-convex optimization model or the linear optimization model, predicting a future optimal conversion rate and a future optimal growth rate by applying the weights to the historical conversion rate and the historical growth rate for the number of historical periods of the historical sales data, and applying the future optimal growth rate and the future optimal conversion rate to current sales pipeline data to determine future sales data.

18 Claims, 5 Drawing Sheets

(56) References Cited

U.S. PATENT DOCUMENTS

| | | | |
|---|---|---|---|
| 2012/0143652 A1* | 6/2012 | Resag | G06O 30/0202 705/7.31 |
| 2012/0278091 A1 | 11/2012 | Yaseen et al. | |
| 2014/0067469 A1* | 3/2014 | Bosworth | G06Q 30/0201 705/7.31 |
| 2014/0143158 A1* | 5/2014 | Wilson | G06Q 30/0278 705/306 |
| 2014/0149772 A1* | 5/2014 | Arora | G06F 1/3234 713/323 |
| 2014/0278620 A1 | 9/2014 | Khan et al. | |
| 2014/0324533 A1 | 10/2014 | Magnaghi et al. | |
| 2015/0025931 A1 | 1/2015 | Li et al. | |
| 2016/0379244 A1* | 12/2016 | Kalish | G06Q 30/0242 705/14.41 |
| 2017/0199845 A1* | 7/2017 | Azar | G06F 17/11 |

OTHER PUBLICATIONS

Kodde et al., "Forecasting corporate revenue and profit: Time-series models versus management and analysts," Journal of Business Finance & Accounting, vol. 11, No. 3, 1984, pp. 381-395.

Bertsimas et al., "Introduction to linear optimization," Athena Scientific Series in Optimization and Neural Computation, vol. 6, Chapter 1, Feb. 1, 1997, pp. 1-40.

Bertsimas et al., "Complexity of linear programming and the ellipsoid method," Introduction to linear optimization, Athena Scientific Series in Optimization and Neural Computation, vol. 6, Chapter 8, Feb. 1, 1997, pp. 359-392.

Anonymous, "System and Method for Analytics-Driven Sales Revenue Prediction," IP.com Electronic Publication, Nov. 7, 2014, pp. 1-17.

\* cited by examiner

REVENUE PREDICTION FOR A SALES PIPELINE USING OPTIMIZED WEIGHTS

BACKGROUND

The present invention relates to data analysis, and more specifically, this invention relates to predicting future sales data by analyzing historical sales data.

Business competitiveness may rely on how accurately organizations predict revenues from pipelines, in a timely manner that allows them to take corrective actions. For example, accurate revenue prediction may allow for fair pre-setting of sales force objectives, and may help in planning and allocating resources ahead of time. As a result, technologies for accurate pipeline prediction are desirable.

Service organizations manage a pipeline of sales opportunities with variable sales engagement lifespan, maturity level (belonging to progressive sales stages), and contract values at any given point in time. Accurate predicting of contract signings by the end of a time period (e.g., quarterly) is a desirable for many IT service organizations in order to get an accurate projection of incoming revenue, and to provide support for delivery planning, resource allocation, and budget and effective sales opportunity management.

While the problem of sales predicting has been investigated in its generic context, sales predicting for services organizations entails considering additional complexity, which has not been thoroughly investigated: (i) considering opportunities in multi-staged sales pipeline, which means providing stage-specific treatment of sales opportunities in each group, and (ii) using the information of the current pipeline build-up, as well as the projection of the pipeline growth over the remaining time period before the end of the time period in order to make predictions.

SUMMARY

A computer-implemented method according to one embodiment includes receiving historical sales data, transforming a nonlinear, non-convex optimization model for weighting optimization into a linear optimization model, determining a number of historical periods of the historical sales data and weights to be applied to a historical conversion rate and a historical growth rate for the number of historical periods of the historical sales data, utilizing the nonlinear, non-convex optimization model or the linear optimization model, predicting a future optimal conversion rate and a future optimal growth rate by applying the weights to the historical conversion rate and the historical growth rate for the number of historical periods of the historical sales data, and applying the future optimal growth rate and the future optimal conversion rate to current sales pipeline data to determine future sales data.

According to another embodiment, a computer program product for performing revenue prediction for a sales pipeline using optimized weights comprises a computer readable storage medium having program instructions embodied therewith, wherein the computer readable storage medium is not a transitory signal per se, and where the program instructions are executable by a processor to cause the processor to perform a method comprising receiving historical sales data, utilizing the processor, transforming a nonlinear, non-convex optimization model for weighting optimization into a linear optimization model, utilizing the processor, determining, utilizing the processor, a number of historical periods of the historical sales data and weights to be applied to a historical conversion rate and a historical growth rate for the number of historical periods of the historical sales data, utilizing the nonlinear, non-convex optimization model or the linear optimization model, predicting, utilizing the processor, a future optimal conversion rate and a future optimal growth rate by applying the weights to the historical conversion rate and the historical growth rate for the number of historical periods of the historical sales data, and applying, utilizing the processor, the future optimal growth rate and the future optimal conversion rate to current sales pipeline data to determine future sales data.

A system according to another embodiment includes a processor and logic integrated with and/or executable by the processor, the logic being configured to receive historical sales data, transform a nonlinear, non-convex optimization model for weighting optimization into a linear optimization model, determine a number of historical periods of the historical sales data and weights to be applied to a historical conversion rate and a historical growth rate for the number of historical periods of the historical sales data, utilizing the nonlinear, non-convex optimization model or the linear optimization model, predict a future optimal conversion rate and a future optimal growth rate by applying the weights to the historical conversion rate and the historical growth rate for the number of historical periods of the historical sales data, and apply the future optimal growth rate and the future optimal conversion rate to current sales pipeline data to determine future sales data.

Other aspects and embodiments of the present invention will become apparent from the following detailed description, which, when taken in conjunction with the drawings, illustrate by way of example the principles of the invention.

DETAILED DESCRIPTION

Figure 1:
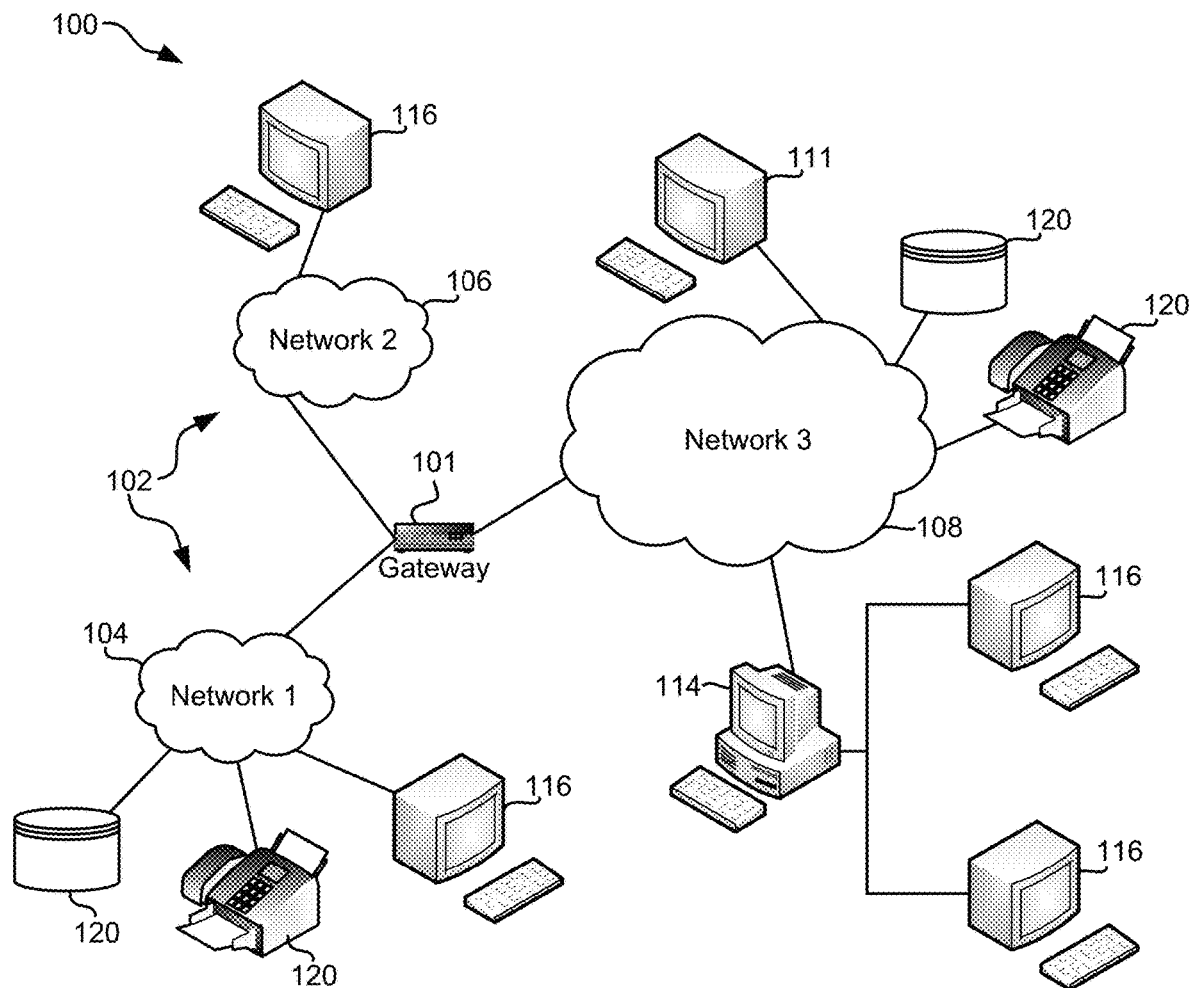
FIG. 1 illustrates a network architecture, in accordance with one embodiment.

The following description discloses several preferred embodiments of systems, methods and computer program products for performing revenue prediction for a sales pipeline using optimized weights. Various embodiments provide a method to utilize a converted linear optimization model to determine optimized historical periods and weights used to predict data used in future sales data prediction.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for performing revenue prediction for a sales pipeline using optimized weights.

In one general embodiment, a computer-implemented method includes receiving historical sales data, transforming a nonlinear, non-convex optimization model for weighting optimization into a linear optimization model, determining a number of historical periods of the historical sales data and weights to be applied to a historical conversion rate and a historical growth rate for the number of historical periods of the historical sales data, utilizing the nonlinear, non-convex optimization model or the linear optimization model, predicting a future optimal conversion rate and a future optimal growth rate by applying the weights to the historical conversion rate and the historical growth rate for the number of historical periods of the historical sales data, and applying the future optimal growth rate and the future optimal conversion rate to current sales pipeline data to determine future sales data.

In another general embodiment, a computer program product for performing revenue prediction for a sales pipeline using optimized weights comprises a computer readable storage medium having program instructions embodied therewith, wherein the computer readable storage medium is not a transitory signal per se, and where the program instructions are executable by a processor to cause the processor to perform a method comprising receiving historical sales data, utilizing the processor, transforming a nonlinear, non-convex optimization model for weighting optimization into a linear optimization model, utilizing the processor, determining, utilizing the processor, a number of historical periods of the historical sales data and weights to be applied to a historical conversion rate and a historical growth rate for the number of historical periods of the historical sales data, utilizing the nonlinear, non-convex optimization model or the linear optimization model, predicting, utilizing the processor, a future optimal conversion rate and a future optimal growth rate by applying the weights to the historical conversion rate and the historical growth rate for the number of historical periods of the historical sales data, and applying, utilizing the processor, the future optimal growth rate and the future optimal conversion rate to current sales pipeline data to determine future sales data.

In another general embodiment, a system includes a processor and logic integrated with and/or executable by the processor, the logic being configured to receive historical sales data, transform a nonlinear, non-convex optimization model for weighting optimization into a linear optimization model, determine a number of historical periods of the historical sales data and weights to be applied to a historical conversion rate and a historical growth rate for the number of historical periods of the historical sales data, utilizing the nonlinear, non-convex optimization model or the linear optimization model, predict a future optimal conversion rate and a future optimal growth rate by applying the weights to the historical conversion rate and the historical growth rate for the number of historical periods of the historical sales data, and apply the future optimal growth rate and the future optimal conversion rate to current sales pipeline data to determine future sales data.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
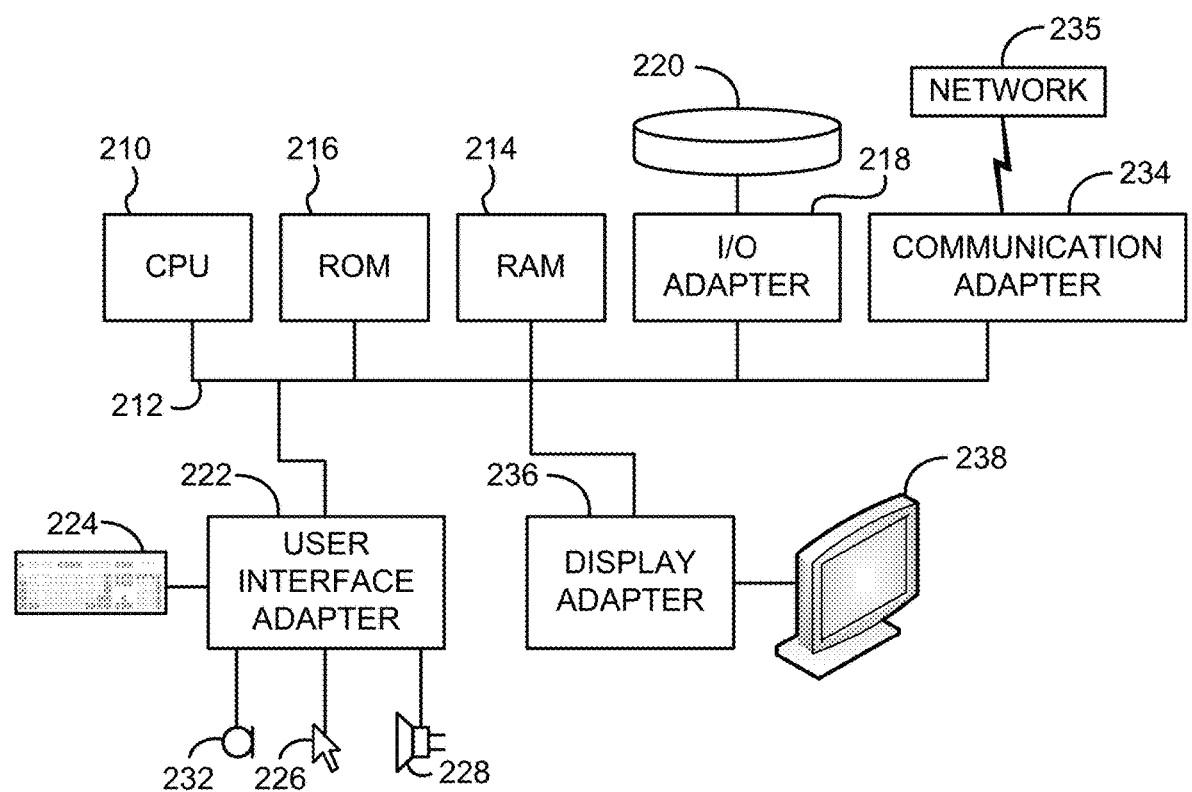
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
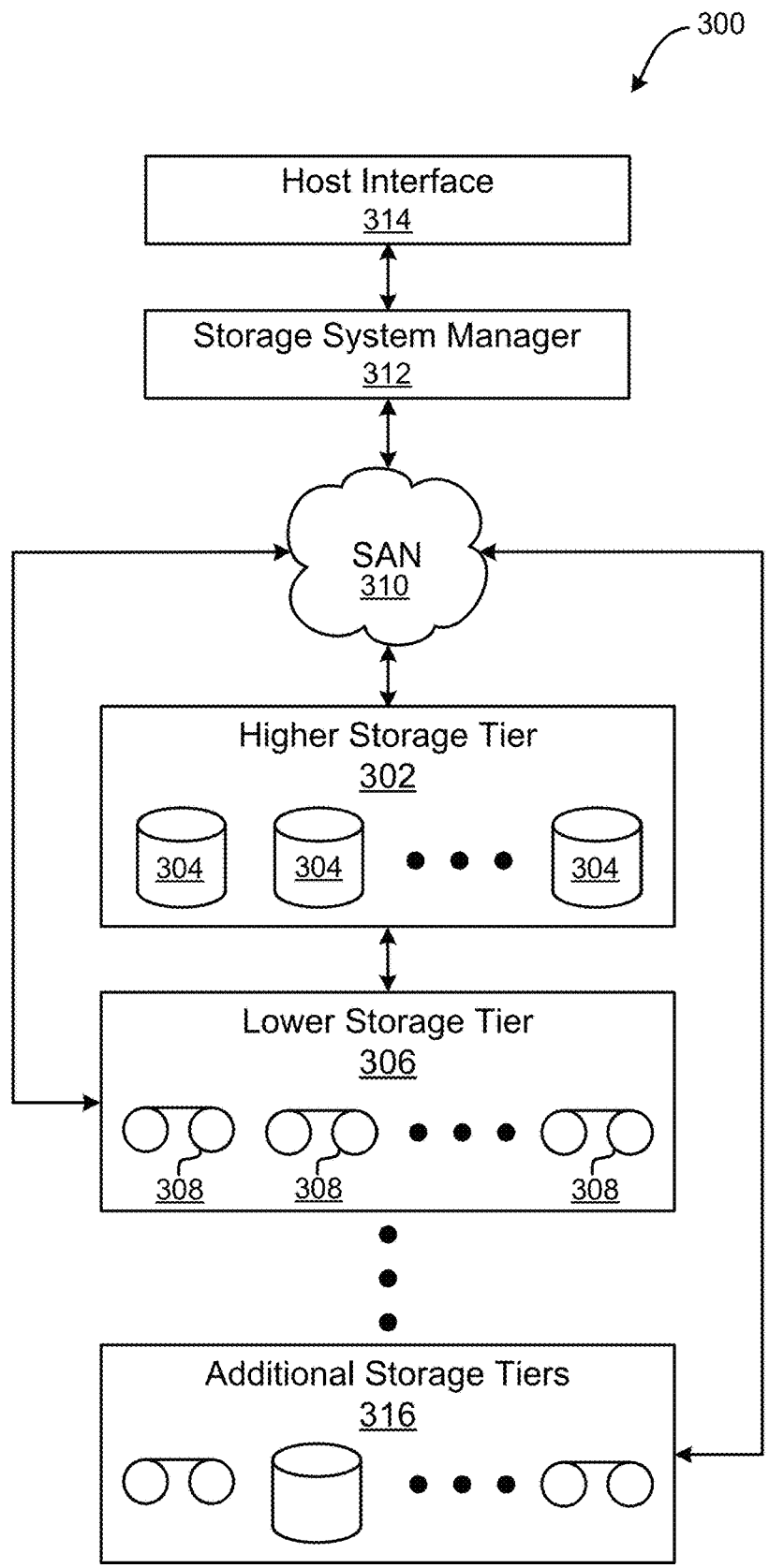
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
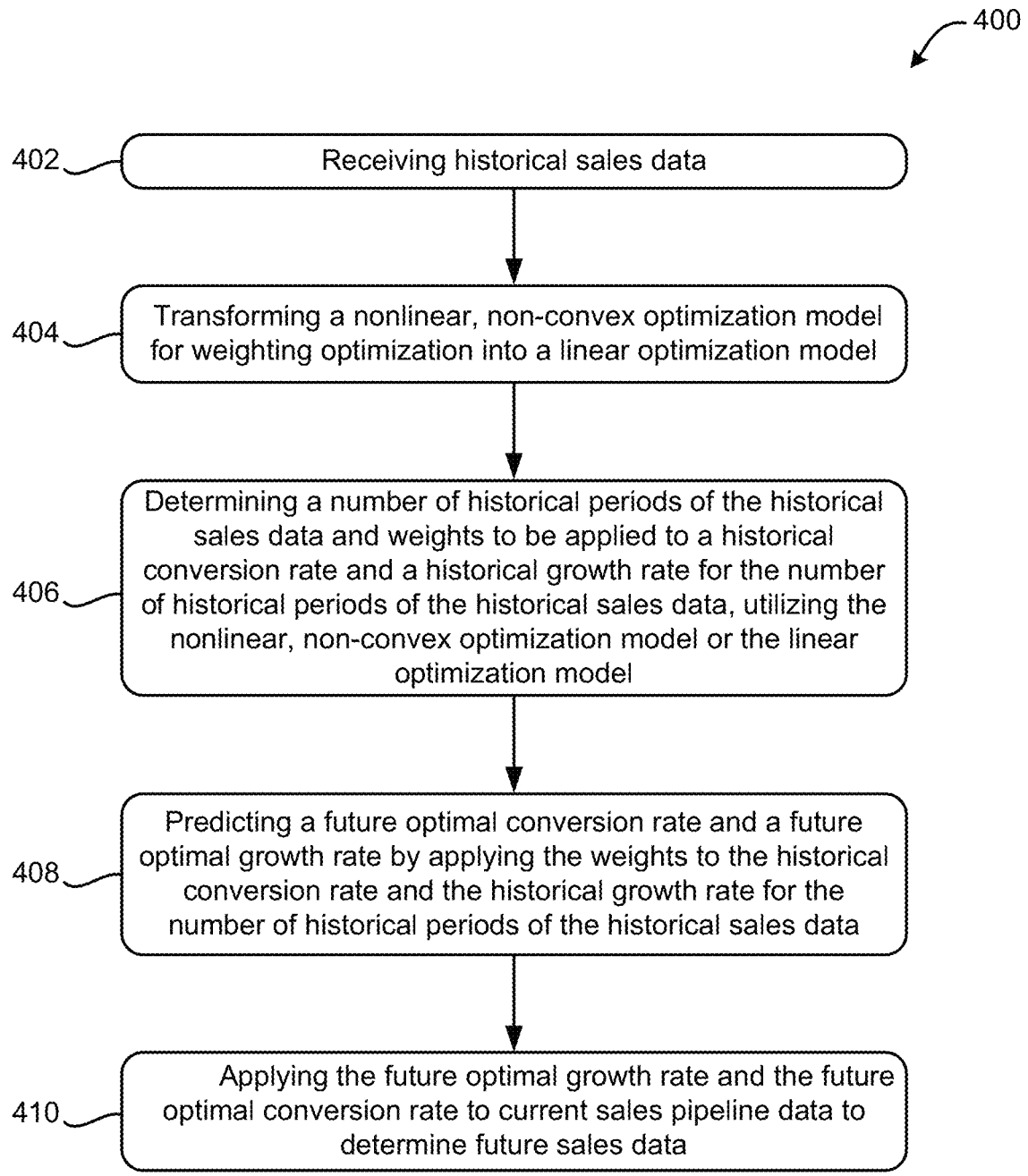
FIG. 4 illustrates a method for performing revenue prediction for a sales pipeline using optimized weights, in accordance with one embodiment.

Now referring to FIG. 4, a flowchart of a method 400 is shown according to one embodiment. The method 400 may be performed in accordance with the present invention in any of the environments depicted in FIGS. 1-3 and 5, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where historical sales data is received. In one embodiment, the historical sales data may include historical sales pipeline revenue data. For example, the historical sales data may include sales revenue obtained during one or more predetermined historical periods.

In another embodiment, the historical sales data may include a potential revenue amount for each of a plurality of sales stages occurring within a predetermined historical sub-period. For example, the sales stages may include a variety of different sales-based occurrences within a sales pipeline. For instance, the sales stages may include an identification stage (e.g., an identification of an opportunity, etc.), a validation stage (e.g., a determination as to whether an entity is able to proceed with an opportunity, etc.), a qualification stage (e.g., a determination as to whether an entity is qualified to compete for an opportunity, etc.), a conditionally won stage, a winning stage (e.g., a determination that the opportunity has been won, etc.), etc. Further still, in one embodiment, the historical sales data may include an indication of a historical super-period (e.g., a fiscal quarter, etc.) of time that encompasses the plurality of historical sub-periods of time (e.g., a fiscal month, etc.). For example, the historical sales data may include an indication of a total amount of revenue realized from the sales opportunities that have been won by the organization during the historical super-period of time.

In yet another embodiment, the historical sales data may further include a revenue amount won for all opportunities within a historical super-period. For example, the revenue amount may indicate a monetary amount to be received by the organization for the agreements and/or contracts that have been resolved and/or completed by the organization during the historical super-period. In one embodiment, each opportunity may include an agreement and/or contract for which the organization is being considered as a provider of a good or service in exchange for monetary compensation.

Also, in one embodiment, the historical sales data may include an indication of a maximum number of periods to be used during a prediction of future sales data. For example, the historical sales data may include a maximum number of historical sub-periods to be used for predicting future sales data. In another embodiment, the historical sales data may be received at one or more computing devices (e.g. one or more servers, one or more cloud computing devices, one or more personal computing devices, etc.) from one or more users and/or other entities (e.g., businesses, corporations, etc.).

Further, as shown in FIG. 4, method 400 may proceed with operation 404, where a nonlinear, non-convex optimization model for weighting optimization is transformed into a linear optimization model. In one embodiment, the nonlinear, non-convex optimization model may be converted to the linear optimization model by reformulating the non-convex optimization model as the linear optimization model. For example, transforming the nonlinear, non-convex optimization model for weighting optimization into the linear optimization model may include replacing a plurality of higher order terms in an objective function of the nonlinear, non-convex optimization model with a plurality of single order variables.

Further still, as shown in FIG. 4, method 400 may proceed with operation 406, where a number of historical periods of the historical sales data and weights to be applied to a historical conversion rate and a historical growth rate for the number of historical periods of the historical sales data are determined utilizing the nonlinear, non-convex optimization model or the linear optimization model. In one embodiment, the nonlinear, non-convex optimization model or the linear optimization model may utilize the received historical sales data to determine an optimal number of historical periods within the historical sales data that need to be analyzed in order to determine a historical growth rate and the historical conversion rate.

Also, in one embodiment, determining the weights to be applied to values within the number of historical periods may include selecting the optimal number of historical periods and determining a weighted value for each of selected historical periods, utilizing the nonlinear, non-convex optimization model or the linear optimization model. In another embodiment, the nonlinear, non-convex optimization model or the linear optimization model may output an optimal number of historical periods of the historical sales data, to be used for a prediction of future values, that gives a minimum prediction error over the historical data.

In addition, as shown in FIG. 4, method 400 may proceed with operation 408, where a future optimal conversion rate and a future optimal growth rate are predicted by applying the weights to the historical conversion rate and the historical growth rate for the number of historical periods of the historical sales data. In one embodiment, the historical conversion rate may indicate a portion of historical sales opportunities that ended up as won by the end of a historical period. In another embodiment, the historical growth rate may include a growth factor indicating how much a historical sales opportunity pipeline has grown from a predetermined point in time.

Further, as shown in FIG. 4, method 400 may proceed with operation 410, where the future optimal growth rate and the future optimal conversion rate are applied to current sales pipeline data to determine future sales data. In one embodiment, the future sales data may include future revenues for a predetermined super-period.

In another embodiment, a revenue prediction for a given super-period may also predict revenue for one or more sub-periods. For example, determined future optimal conversion rates may be applied to the plurality of sales opportunities within the current pipeline data to determine a prediction for a sub-period, and then the determined growth rate may be applied to the sub-period prediction to determine a prediction for the super-period.

Additionally, in one embodiment, for each of a plurality of sales stages, the future optimal conversion rate may be predicted for the sales stage and may be applied to the current sales pipeline data of the sales stage to predict a future won value for the sales stage. In another embodiment, the future optimal growth rate may be applied to a prediction for a current sub-period to determine a prediction for a current super-period. In yet another embodiment, predicted future won values of a plurality of sales stages may be aggregated to get a total won value for a current sub-period.

In this way, an optimal number of historical periods may be determined and used with optimized weights from the optimization model to identify predicted future optimal growth and conversion rates, which may minimize an amount of data that is needed to be processed by a computing device to perform future sales data predictions.

Further, pulling data that is too old may be a cumbersome process, and such data may not be relevant to the prediction of newest periods. Therefore, by eliminating non-relevant data that may be difficult and resource intensive to obtain, the performance of a system performing predictions may be improved. Additionally, by calculating optimized weights for each of the periods, more accurate predictions may be obtained.

The problem of sales predicting may be formulated, considering the service-specific context, as a machine learning problem over the set of historical services sales data. An optimization approach may be provided for finding the optimized weights of a sales predicting function that minimizes the average error rates for predicting sales based on two factors of conversion rates and growth factors, for any given point in time in a sales period, over historical sales data. The results may demonstrate superior performance (in terms of absolute and relative errors).

Services Sales organization is one of few common pillars of every IT Services company. The mission of sales organization may include organizing a sales force and effectively managing a pipeline of sales opportunities through a process that yield into orders and contracts signings. One of the key enablers of an effective sales management practice may include the ability to predict sales one quarter, two quarters, or sometimes up to a year in advance.

In particular, one problem of sales predicting is casted as that of predicting the sales amount by the end of the target super-period (e.g., the end of the quarter). In its generic context, this problem may be investigated in many ways. For example, one method for modeling this problem may include using the data from historical time periods to predict the target-end sales value using a learned model from the historical sales data, and considering the current sales build up in the sales pipeline.

Some techniques may deploy techniques such as time-series analysis, regression, or curve fitting for this purpose. However, this method of modeling the problem may be simplistic, specifically for a services organization, for two reasons: (1) not all sales opportunities in the sales pipeline may be equal in terms of maturity, meaning that some are closer compared to others to being closed within the target time period.

Most approaches that consider all sales opportunities in the pipeline in an aggregate level do not consider the maturity of sales opportunities. That is; they do not approach the problem as a pipeline sales opportunities one that would have some of these opportunities ending up as being won, the projected closing date for some other moved beyond the time horizon of the target time period, and some others being lost. They rather just predict an end resulting sales value. Even solutions dealing with predicting won sales values out of potential opportunities and thus indeed make the assumption that the distribution of the maturities of the sales opportunities in the current pipeline is similar or the same as the ones in the historical data.

And, (2) many approaches may consider the value of current sales opportunities in the pipeline as the single input in projecting the quarter-end pipeline value. However, using the current pipeline value may be best used for identifying which portion of the current pipeline may be ended up as won (e.g., converted to contract, etc.), e.g., by learning/applying a sales conversion factor to compute the won value of the pipeline at the end of target period.

Another important factor may include predicting how much the pipeline may grow from that point in time (e.g., referred as "growth factor"). This factor may be positive in the beginning of time period (where more opportunities are constantly added to the sales pipeline with a projected closing date within the target time period), and from a given point of time (varying depending to the type of business) the pipeline may not monotonically grow throughout the target period, and indeed after a given time period (e.g., after mid-period) it may start shrinking as new sales opportunities are not added with a target closing date of that period anymore, and as fate of some others are identified as loss, or their projected closing date are transferred to a next target period.

Therefore, it is important to define the problem in a way that both maturity of sales opportunities, as well as the growth factor of the pipeline from any point in the target time period are taken into account for a more accurate prediction.

In one embodiment, the problem of services sales predicting may be defined for a services pipeline by taking into account both aspects pointed out earlier. In particular, this model may enable the segmenting of the sales opportunities in the pipeline according to their maturity levels. In particular, a sales organization may define different sales stages for sales opportunities, e.g., identified sales opportunities, i.e., those that a seller has identified with a potential client; 'validated' as those that are independently verified by the organization, 'active' as those that are currently actively being worked out by the sales organization towards a contract, and 'won' as those that are marked as won as there is a contract in place.

As it can be seen, the opportunities in each of these categories have a different maturity and therefore a different potential timeline to be closed, and there may be more chances that more that are further along the process to be closed within the target sales period. And, therefore, each of these sales opportunities may have a different sales conversion rate (i.e., portion of those opportunities that will be ended up as won by the end of the target period), and a different growth factor, meaning the pipeline may grow with different proportion with sales opportunities in each of these categories, for which they have a target closing date within the target sales period.

According to this formulation, then the problem of sales predicting may be defined as that of, for opportunities in each of different sales stage categories, to predict the sales stage conversion factor, and the sales stage growth factor. Based on this formulation, given these two factors, and the current value of each sales stage pipelines, the period-end sales value may be predicted.

The problem of predicting sales stage conversion factor, and growth factor for opportunities in each of different sales stages may be defined as a machine learning problem over the historical sales data in the sales pipelines with corresponding sales stages. In particular, the sales stage conversation factor may be defined over the historical data of the same sales stage as a weighted average function. In such a function, two set of variables exist: (i) how many historical time periods should be used in computing the weighted average function, and (ii) how to identify the weights in this function to yield in the best prediction accuracy.

The problem of learning weights in this weighted average function may be formulated as an optimization problem. The objective function of the optimization function may minimize the average prediction accuracy of all target sales periods in the historical data. In addition, in this optimization problem we use all available historical periods of sales data for any given target sales period within the historical data, i.e., all historical time periods before the given time period, which may be considered as target time period for prediction during the optimization.

Such a formulation may yield identifying the appropriate optimized weights for any useful historical data, among all available historical periods, and therefore addressing the problem of identifying the number of exact historical time periods that are needed for making predictions. Thus, this work may fall in the hot area of the intersection of machine learning and optimization with a unique services oriented application.

In another embodiment, the problem of sales predicting may be defined over a multi-staged pipeline, which considers the maturity of different sales opportunities. This may be different compared to other solutions and may alter sales predicting due to different pipeline build up rate and conversion rates of opportunities in these different pipelines.

Additionally, in one embodiment, the problem of sales predicting may be defined using two factors of sales stage conversion factor, and growth factor considering the value of the pipeline for each sales stages, and the historical data. The value of each factors for a target period may be defined as a weighted average function over the available historical data.

In another embodiment, the problem of learning weights of the weighted average function for each of the factor may be cast as an optimization function, in which the goal is to minimize the average error rate of the prediction of the factor value.

In yet another embodiment, the optimization function for learning value of optimized weights may be a non-linear function non-convex non-concave, for which it is known that finding the optimal solution is NP-Hard. This problem may be transformed into a linear problem, which may leverage certain constraints that are inherent to this problem, which may be solved to guaranteed optimality and may not be an np-hard problem.

In one embodiment, the inputs and desired outputs of the problem may be formally defined, and a formulated model may be presented for weight optimization. In another embodiment, the potential opportunities in a current subset period (smaller period, e.g., weeks or months) may be used to predict a superset period-end revenue (e.g., month or quarter). Since the most widely used period-end revenue reporting period is the quarter and the week is a typical subset period in our problem, both are used in the below analysis. However, any other subset and superset periods may be used instead.

Table 1 illustrates exemplary problem input definitions. Of course, it should be noted that the problem input definitions shown in Table 1 are set forth for illustrative purposes only, and thus should not be construed as limiting in any manner.

TABLE 1

| | |
|---|---|
| 1) | $Value_{li}$, which is the total monetary potential pipeline value at week $i \in I$ in a particular quarter $l \in Q$ of a certain year, where I is the ordered set of all available weeks ordered so that older weeks come first, and Q is the set of quarters for all years in the used history. |
| 2) | $WonValue_{li}$, which is the total monetary won part of the potential $Value_{li}$ of week $i \in I$ that ended up being won in quarter $l \in Q$. We assume here that the won value is only known by the end of that quarter. |
| 3) | $WonQtrEnd_l$, which is the total monetary won at the end of the quarter $l \in Q$. |
| 4) | M, the maximum number of periods in the history that are allowed to be used to predict the revenue of any particular future period, $M \leq \lceil \frac{\|Q\|}{2} \rceil$, where $\|Q\|$ is the cardinality of the set Q. Note that with this definition on the limits of M, we guarantee being able to get the prediction for $\lceil \|Q\|/2 \rceil$ super periods regardless of how many historical periods we use since that latter number of periods cannot exceed M. We focus our predictions for the latest M periods and call those the "Considered Periods". Also, let $\Omega$ be the set of possible number of historical periods that can be used in the prediction, i.e., $\Omega = \{1, \ldots, M\}$. |
| 5) | $\epsilon$, the maximum accepted difference between the prediction error associated with using some historical periods compared to the best found prediction error, where the prediction error is the sum of the absolute difference between the predicted value and the actual value, for all the considered periods. |

Table 2 illustrates exemplary problem output definitions. Of course, it should be noted that the problem output definitions shown in Table 2 are set forth for illustrative purposes only, and thus should not be construed as limiting in any manner.

TABLE 2

| | |
|---|---|
| 1) | N, optimal minimum number of historical periods that we should use for predicting any future value. Note that $N \leq M$. |
| 2) | A procedure of predicting the quarter end won revenue for any future week based on assigning optimal weights to its known history |

Table 3 illustrates an exemplary formulation of the problem of predicting the quarter end won revenue for quarter $q \in Q$ for any target week $i \in I$, $Prediction_{qi}$, if we are using $m \in \Omega$ historical periods. Of course, it should be noted that the problem formulation shown in Table 3 is set forth for illustrative purposes only, and thus should not be construed as limiting in any manner.

TABLE 3

$$Prediction_{qi} = \left( \sum_{l=q-m}^{l=q-1} \left( W_{m,l-q} * \frac{WonValue_{li}}{Value_{li}} \right) \right) *$$

$$\left( \sum_{l=q-m}^{l=q-1} \left( X_{m,l-q} * \frac{WonQtrEnd_l}{WonValue_{li}} \right) \right) *$$

$$= \left( \sum_{l=q-m}^{l=q-1} \left( W_{m,l-q} * \frac{WonValue_{li}}{Value_{li}} \right) \right) *$$

$$\left( X_{m,l-q} * \frac{WonQtrEnd_l}{WonValue_{li}} \right) *$$

$$Value_{qi}$$

As shown in Table 3, the first part $W_{ml}*(WonValue_{li}/Value_{li})$ represents the prediction for the conversion rate (i.e., part of the potential pipeline that would end up being won for that week). This prediction is the weighted sum of the actual conversion rates for the past m periods to our period $i \in I$. Thus, $W_{ml}$ is the weight assigned to the ratio ($WonValue_{li}/Value_{li}$) for each $m \in M$ to each quarter l preceding the target quarter $q \in Q$ (up to m such quarters) for week $i \in I$.

The second part $(X_{ml}*(WonQtrEnd_l/WonValue_{li}))$ represents the prediction of the growth rate (ratio between the total won revenue for quarter $q \in Q$ to that won at the end of the same quarter but was related to opportunities as of week $i \in I$). Again, this is predicted as the weighted sum of the actual ratio for the m weeks prior to quarter $q \in Q$. Similarly, $X_{ml}$ is the weight assigned to the ratio ($Won^q trEnd_l/WonValue_l$) with the same previously defined l and m. Now, our task is to come up with the optimal values for the weights $W_{ml}$ and $X_{ml} \forall m \in \Omega$ and $\forall l \in \{q-m, \ldots, q-1\}$ that minimizes the total absolute error, where the error is the difference between predicted and actual values.

Table 4 illustrates an exemplary optimization model to obtain the above values. Of course, it should be noted that the optimization model in Table 4 is set forth for illustrative purposes only, and thus should not be construed as limiting in any manner.

TABLE 4

$$\min \sum_{m \in \Omega} Z_m$$

$$\text{s.t.} \sum_{l=-m}^{l=-1} W_{ml} = 1, \forall\, m \in \Omega$$

$$\sum_{l=-m}^{l=-1} X_{ml} = 1, \forall\, m \in \Omega$$

$$W_{ml} \geq 0, \forall\, l \in \{-m, \ldots, -1\}, \forall\, m \in \Omega$$

$$X_{ml} \geq 0, \forall\, l \in \{-m, \ldots, -1\}, \forall\, m \in \Omega$$

$$Z_m = \sum_{q \in Q: (q-m) \in Q} \sum_{i \in I} \left| \left[ \left( \sum_{l=q-m}^{l=q-1} \left( W_{m,l-q} * \frac{\text{WonValue}_{li}}{\text{Value}_{li}} \right) * \left( X_{m,l-q} * \frac{\text{WonQtrEnd}_l}{\text{WonValue}_{li}} \right) \right) * \text{Value}_{qi} \right] - \text{WonQtrEnd}_q \right|, \forall\, m \in \Omega$$

In one embodiment, the objective function in Table 4 minimizes the sum of all the absolute prediction errors for all considered cases (i.e., cases with different historical periods used in the prediction). The above constraints may ensure that the weights that we are trying to optimize sum up to one. The constraints may also include a non-negativity constraint. The constraints may also define an objective function value for each of the aforementioned considered cases.

The model shown in Table 4 is a nonlinear nonconvex programming model. It may be converted to a linear programming model as follows: Define $Y_{mrs} = W_{mr} * X_{ms}$ $\forall\, m \in \Omega$, $\forall r \in \{q-m, \ldots, q-1\}$, $\forall s \in \{q-m, \ldots, q-1\}$. That is, if m=4, i.e., we use 4 historical periods for our weighted average prediction, then, there would be 16 variables for the Y decision variable vector. Using this, the model in Table 4 may be reformulated.

Table 5 illustrates an exemplary reformulation of the optimization model shown in Table 4. Of course, it should be noted that the reformulation is set forth for illustrative purposes only, and thus should not be construed as limiting in any manner.

TABLE 5

$$\min \sum_{m \in \Omega} Z'_m$$

$$\text{s.t.} \sum_{r=-m}^{r=-1} \sum_{s=-m}^{s=-1} Y_{mrs} = 1, \forall\, m \in \Omega$$

$$Y_{mrs} \geq 0, \forall\, r \in \{-m, \ldots, -1\},$$
$$\forall\, s \in \{-m, \ldots, -1\}, \forall\, m \in \Omega$$

$$Z'_m = \sum_{q \in Q: (q-m) \in Q} \sum_{i \in I} \left| \left[ \left( \sum_{r=q-m}^{r=q-1} \sum_{s=q-m}^{s=q-1} Y_{m,r-q,s-q} * \left( \frac{\text{WonValue}_{ri}}{\text{Value}_{ri}} \right) * \left( \frac{\text{WonQtrEnd}_s}{\text{WonValue}_{si}} \right) \right) * \text{Value}_{qi} \right] - \text{WonQtrEnd}_q \right|, \forall\, m \in \Omega$$

In one embodiment, the model in Table 4 may not yield a worse solution than the model in Table 5. In this way, using the linear model, it may be guaranteed we cannot get a worse solution than the nonlinear one. Note that, we can apply a known trick, in the linear programming literature, on the absolute values in the objective functions of the latter model to convert it to a linear programming model that is easy to solve. Note also that it is separable by $m \in \Omega$, which makes it even easier to solve.

Table 6 illustrates an exemplary calculation of the two required outputs shown in Table 2, utilizing the model shown in Table 5. Of course, it should be noted that the calculation is set forth for illustrative purposes only, and thus should not be construed as limiting in any manner.

TABLE 6

1) Calculate N and the optimal weights $Y_{rs}$ as follows:

$$N = \underset{m \in \Omega}{\arg\min}\, m': \left( \left( z'_m - \min_{m \in \Omega} z'_m \right) \leq \epsilon \right)$$

$$Y_{rs} = Y_{Nrs} \forall\, r \in \{-N, \ldots, -1\},$$
$$\forall\, s \in \{-N, \ldots, -1\}$$

2) For any future week i, we calculate the prediction of its quarter-end (for quarter k which is typically one quarter after the last quarter in the set Q) won monetary value as follows:

$$\text{Prediction}_{ik} = \sum_{r=k-N}^{r=k-1} \sum_{s=k-N}^{s=k-1} \left( Y_{rs} * \left( \frac{\text{WonValue}_{ri}}{\text{Value}_{ri}} * \frac{\text{WonQtrEnd}_s}{\text{WonValue}_{si}} \right) \right) * \text{Value}_{ik}$$

We note that the ordered set I may be ordered with regards to weeks in the same quarter first then with regards to the quarters, or else it could be ordered with regards to the quarters first. In the former sorting, our prediction may be using the previous m weeks to the target week for doing the prediction, while in the latter one, it will be using the same week in the previous m quarters to do the prediction. In one embodiment, one may try both ways and see which yields better results (a lower objective function value for our model).

Another note is that the non-linear model may include a straight formulation for the abstraction of the problem as we presented it. One natural flow may be to construct it first and then mathematically drive the linear one from it, as opposed to coming up with the linear model from the beginning. A third note is that incorporating different sales stages (e.g., identified, validated, active, and won) may be added to the model by incorporating a set S in the potential and won values.

In one embodiment, the decision variables (weights) may or may not have a sales stage index, depending on whether it would be an over fit for the model to have a different set of weights for each sales stage. Given the typical sparsity of data in applications like the one we focus on in our next Section, using one set of weights for all sales stages (though input parameters still need to differentiate between these stages) may improve results.

Lastly, note also that all models may be embedded into a machine learning framework, i.e., applied to a training set of data and then tested for results (weights and number of historical periods to use) on the testing data.

In this way, the problem of sales predicting for a services sales organization in which sales opportunities move along several sales stages in the pipeline may be investigated. The problem of sales predicting in a services organization may be formulated as a weighted function over the two factors of conversion rate applied on the current value of the sales opportunities in each of the sales stages pipeline to get the projected won value of the pipeline, and a growth factor that projects the ratio of the growth of the pipeline from any given time up to the end of the time period (e.g., end the of the quarter).

Then, the problem of sales predicting may be casted as a machine learning problem for learning the weights of the predicting function from the historical data. The weight learning may be approached as an optimization problem with the objective of minimizing the average error rates of sales prediction for opportunities in any of the sales stages pipelines based on all historical data available before the given target time period.

A theoretical framework may be described for transforming the resulting non-linear optimization into a linear optimization problem for which an optimal solution can be found.

Figure 5:
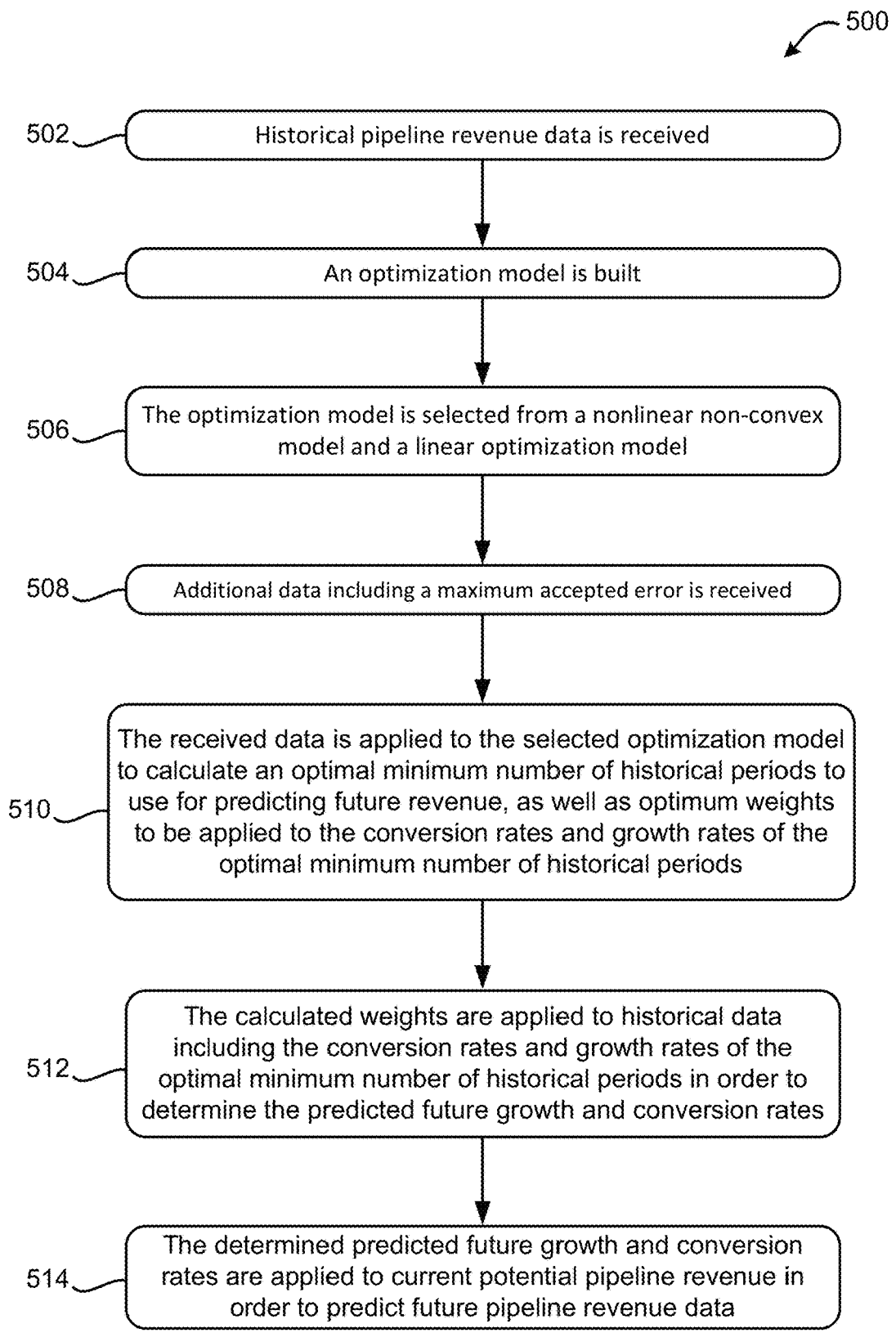
FIG. 5 illustrates a method for predicting future pipeline revenue data using an optimization model, in accordance with one embodiment.

Now referring to FIG. 5, a flowchart of a method 500 for predicting future pipeline revenue data using an optimization model is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where historical pipeline revenue data is received. In one embodiment, the historical pipeline revenue may include a potential pipeline value (e.g., a potential revenue amount for all sales stages falling within a historical sub-period) and a won portion of that potential pipeline over multiple sub-periods (e.g., a fiscal week, fiscal month, etc.). In another embodiment, the historical pipeline revenue may also include the total won revenue at the end of a super-period (e.g., a fiscal quarter, etc.) for all opportunities within the historical sales pipeline. In yet another embodiment, the historical pipeline revenue may further include an indication of a minimum number of periods to be used in performing a weighted average revenue prediction.

Additionally, method 500 may proceed with operation 504, where an optimization model is built. In one embodiment, the optimization model may assign optimal weights to the received historical periods. In another embodiment, the optimization model may use the indication of the maximum number of periods as a decision variable. In yet another embodiment, the optimization module may have an objective of minimizing a sum of an absolute prediction error.

Further, method 500 may proceed with operation 506, where the optimization model is selected from a nonlinear non-convex model and a linear optimization model. Further still, method 500 may proceed with operation 508, where additional data including a maximum accepted error is received.

Also, method 500 may proceed with operation 510, where the received data is applied to the selected optimization model to calculate an optimal minimum number of historical periods to use for predicting future revenue, as well as optimum weights to be applied to the conversion rates and growth rates of the optimal minimum number of historical periods.

Furthermore, method 500 may proceed with operation 512, where the calculated weights are applied to historical data including the conversion rates and growth rates of the optimal minimum number of historical periods in order to determine the predicted future growth and conversion rates.

Further still, method 500 may proceed with operation 514, where the determined predicted future growth and conversion rates are applied to current potential pipeline revenue (e.g., a potential revenue amount that is currently in the pipeline and that represents potential sales opportunities in the pipeline, etc.) in order to predict future pipeline revenue data. In one embodiment, the future pipeline revenue data may include revenue for a future sub-period (e.g., a future week's revenue, etc.), a future super-period (e.g., a future quarter end revenue, etc.), etc. For example, revenue for a sub-period may be predicted during the prediction of revenue for a super-period.

In this way, an automated optimized procedure is implemented for determining an optimal number of periods in a history that should be used for determining growth and conversion rates that are in turn used to predict future revenue values. Additionally, revenue is optimized based on a function that is formulated by taking into account a current pipeline value, historical win rates and also future pipeline growth from any given point-in-time in the period up to the end of a quarter, where such a function is non-linear non-convex.

Additionally, in one embodiment, period-end pipeline revenue prediction may be predicted. For example, period-end pipeline revenue prediction may be performed utilizing variables including a given point in time within a target period. In another example, an optimized weighted average may be calculated over historical periods, where a minimum amount of historical data needed to calculate the prediction is identified.

In another embodiment, pipeline revenue prediction may be performed. For example, potential revenues may be built in a pipeline in earlier time periods (e.g., negative and/or positive weeks of a quarter, etc.), where part of it ends up being won and part ends up being lost at a later time period that is the focus of the prediction (e.g., week +15 of a quarter, etc.).

Further, in one embodiment, the optimization model may be built for obtaining optimized weights applied to data from historical sales periods for predicting the conversion rates and growth rates that can be then applied to the current pipeline to predict the period-end revenue given a desired set of time intervals within a sales period. In another embodiment, the developed optimization model may be run for $m=\{1, \ldots, \text{ceiling}\_\{i/2\}\}$, and finding N (a minimum number of periods) which may achieve a prediction error within a given threshold Epsilon from the lowest achievable prediction error for any value of m. In another embodiment, a prediction error may be defined as an absolute difference between actual and predicted values.

Further still, in one embodiment, given a current sales pipeline value of a given point-in-time of the target period, period-end sales revenue may be predicted by multiplying the current pipeline value by the predicted won percentage and the predicted growth rate. Also, in one embodiment, the optimization model may consider the won percentage of the pipeline value for any given point-in-time as well as the growth rate of the won pipeline value by the period-end, which may result in a non-linear non-convex function. In another embodiment, the resulting non-linear non-convex function may be converted to a linear one, which may be efficiently solved to guaranteed global optimality.

Also, in one embodiment, the model may find a minimum number of periods in historical data needed in the optimization, and the quarter end won revenue of the current pipeline value may be predicted by applying the optimized weights to the won percentage of the pipeline value for the same point-in-time in N previous sales periods of the target period.

In addition, in one embodiment, the competitiveness of businesses may rely on how accurately they predict revenues from pipelines, in a timely manner that allows them to take corrective actions. As a result, services and customers are both interested in technologies for accurate pipeline prediction. The above implementation may help in assessing one or more sales teams as well as designing incentives, making resource allocation decisions, budgeting, performing financial planning, etc.

Also, for pipeline revenue prediction, the prediction of which part of the pipeline at that period will end up being won may be predicted, as well as what revenues will add up to the pipeline and end up being won in the target period. In this way, an automated optimized method for determining the minimum number of periods in the history that should be used for predicting a future value and achieving a minimum acceptable prediction accuracy level may be obtained.

In one embodiment, a method for sales pipeline revenue prediction may use optimized weighted historical data.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
receiving historical sales data at a computing device;
minimizing an amount of the historical sales data to be processed by the computing device to perform future sales data predictions, utilizing machine learning, by:
transforming a nonlinear, non-convex optimization model for weighting optimization into a linear optimization model by replacing a plurality of higher order terms in an objective function of the nonlinear, non-convex optimization model with a plurality of single order variables, where the linear optimization model outputs an optimal number of historical periods of the historical sales data, to be used for a prediction of future values, that gives a minimum prediction error over the historical sales data,
embedding the nonlinear, non-convex optimization model into a first machine learning framework,
embedding the linear optimization model into a second machine learning framework,
applying the first machine learning framework and the second machine learning framework to a training set of data,
determining, by the computing device, a number of historical periods of the historical sales data and weights to be applied to a historical conversion rate and a historical growth rate for the number of historical periods of the historical sales data, utilizing the first machine learning framework or the second machine learning framework, and
predicting a future optimal conversion rate and a future optimal growth rate by applying the weights to the historical conversion rate and the historical growth rate for the number of historical periods of the historical sales data; and
performing, by the computing device, the future data sales predictions, including:
applying the future optimal growth rate and the future optimal conversion rate to current sales pipeline data to determine future sales data, where for each of a plurality of sales stages, the future optimal conversion rate is predicted for the sales stage and is applied to the current sales pipeline data of the sales stage to predict a future won value for the sales stage, the future won value indicating a monetary amount to be received for agreements completed during the sales stage, and aggregating predicted future won values of a plurality of sales stages to get a total won value for a current sub-period.

2. The computer-implemented method of claim 1, wherein the second machine learning framework performs weight learning via optimization with an objective of minimizing average error rates of sales prediction for opportunities in any sales stages pipeline based on the historical sales data.

3. The computer-implemented method of claim 1, further comprising:
applying the future optimal conversion rate to a plurality of sales opportunities within the current sales pipeline data to determine a prediction for the current sub-period; and
applying the future optimal growth rate to the prediction for the current sub-period to determine a prediction for a super-period.

4. The computer-implemented method of claim 1, wherein the nonlinear, non-convex optimization model minimizes a sum of all absolute prediction errors for all considered cases.

5. The computer-implemented method of claim 1, wherein the future optimal growth rate is applied to a prediction for a current sub-period to determine a prediction for a current super-period.

6. The computer-implemented method of claim 1, wherein the historical sales data includes a potential revenue amount for each of a plurality of historical sales stages occurring within a predetermined historical sub-period, including:
an historical identification of an opportunity,
an historical determination as to whether an entity is able to proceed with the opportunity,
an historical determination as to whether the entity is qualified to compete for the opportunity, and
an historical determination that the opportunity has been won.

7. The computer-implemented method of claim 1, wherein the historical conversion rate indicates a portion of historical sales opportunities that ended up as won by an end of a historical period.

8. The computer-implemented method of claim 1, wherein the historical growth rate includes a growth factor indicating how much a historical sales opportunity pipeline has grown from a predetermined point in time.

9. The computer-implemented method of claim 1, wherein the future sales data includes future revenues for a predetermined super-period.

10. A computer program product for performing revenue prediction for a sales pipeline using optimized weights, the computer program product comprising a computer readable storage medium having program instructions embodied therewith, wherein the computer readable storage medium is not a transitory signal per se, the program instructions executable by a processor to cause the processor to perform a method comprising:
receiving historical sales data at a computing device, utilizing the processor;
minimizing, utilizing the processor and machine learning, an amount of the historical sales data to be processed by the computing device to perform future sales data predictions by:
transforming a nonlinear, non-convex optimization model for weighting optimization into a linear optimization model by replacing a plurality of higher order terms in an objective function of the nonlinear, non-convex optimization model with a plurality of single order variables, utilizing the processor, where the linear optimization model outputs an optimal number of historical periods of the historical sales data, to be used for a prediction of future values, that gives a minimum prediction error over the historical sales data,
embedding the nonlinear, non-convex optimization model into a first machine learning framework, utilizing the processor,
embedding the linear optimization model into a second machine learning framework, utilizing the processor,
applying the first machine learning framework and the second machine learning framework to a training set of data, utilizing the processor,
determining, by the computing device, utilizing the processor, a number of historical periods of the historical sales data and weights to be applied to a historical conversion rate and a historical growth rate for the number of historical periods of the historical sales data, utilizing the first machine learning framework or the second machine learning framework, and
predicting, utilizing the processor, a future optimal conversion rate and a future optimal growth rate by applying the weights to the historical conversion rate and the historical growth rate for the number of historical periods of the historical sales data; and
performing, by the computing device, utilizing the processor, the future data sales predictions, including:
applying, utilizing the processor, the future optimal growth rate and the future optimal conversion rate to current sales pipeline data to determine future sales data, where for each of a plurality of sales stages, the future optimal conversion rate is predicted for the sales stage and is applied to the current sales pipeline data of the sales stage to predict a future won value for the sales stage, the future won value indicating a monetary amount to be received for agreements completed during the sales stage, and
aggregating predicted future won values of a plurality of sales stages to get a total won value for a current sub-period.

11. The computer program product of claim 10, wherein the historical sales data includes a revenue amount won for all opportunities within a historical super-period.

12. The computer program product of claim 10, wherein the method further comprises:
applying, utilizing the processor, the future optimal conversion rate to a plurality of sales opportunities within the current sales pipeline data to determine a prediction for the current sub-period; and
applying, utilizing the processor, the future optimal growth rate to the prediction for the current sub-period to determine a prediction for a super-period.

13. The computer program product of claim 10, wherein the nonlinear, non-convex optimization model minimizes a sum of all absolute prediction errors for all considered cases.

14. The computer program product of claim 10, wherein the future optimal growth rate is applied, utilizing the processor, to a prediction for a current sub-period to determine a prediction for a current super-period.

15. The computer program product of claim 10, wherein the historical sales data includes a potential revenue amount for each of a plurality of historical sales stages occurring within a predetermined historical sub-period, including:

an historical identification of an opportunity,
an historical determination as to whether an entity is able to proceed with the opportunity,
an historical determination as to whether the entity is qualified to compete for the opportunity, and
an historical determination that the opportunity has been won.

16. The computer program product of claim 10, wherein the historical conversion rate indicates a portion of historical sales opportunities that ended up as won by an end of a historical period.

17. The computer program product of claim 10, wherein the historical growth rate includes a growth factor indicating how much a historical sales opportunity pipeline has grown from a predetermined point in time.

18. A system, comprising:
a processor and logic integrated with and/or executable by the processor, the logic being configured to:
receive historical sales data at a computing device;
minimize an amount of the historical sales data to be processed by the computing device to perform future sales data predictions, utilizing machine learning, by:
    transforming a nonlinear, non-convex optimization model for weighting optimization into a linear optimization model by replacing a plurality of higher order terms in an objective function of the nonlinear, non-convex optimization model with a plurality of single order variables, where the linear optimization model outputs an optimal number of historical periods of the historical sales data, to be used for a prediction of future values, that gives a minimum prediction error over the historical sales data,
    embedding the nonlinear, non-convex optimization model into a first machine learning framework,
    embedding the linear optimization model into a second machine learning framework,
    applying the first machine learning framework and the second machine learning framework to a training set of data,
    determining, by the computing device, a number of historical periods of the historical sales data and weights to be applied to a historical conversion rate and a historical growth rate for the number of historical periods of the historical sales data, utilizing the first machine learning framework or the second machine learning framework, and
    predicting a future optimal conversion rate and a future optimal growth rate by applying the weights to the historical conversion rate and the historical growth rate for the number of historical periods of the historical sales data; and
perform, by the computing device, the future data sales predictions, including:
    applying the future optimal growth rate and the future optimal conversion rate to current sales pipeline data to determine future sales data, where for each of a plurality of sales stages, the future optimal conversion rate is predicted for the sales stage and is applied to the current sales pipeline data of the sales stage to predict a future won value for the sales stage, the future won value indicating a monetary amount to be received for agreements completed during the sales stage, and
    aggregating predicted future won values of a plurality of sales stages to get a total won value for a current sub-period.

* * * * *